(12) United States Patent
Huang et al.

(10) Patent No.: US 10,755,022 B2
(45) Date of Patent: Aug. 25, 2020

(54) ELECTRONIC APPARATUS AND LAYOUT METHOD FOR INTEGRATED CIRCUIT

(71) Applicant: Winbond Electronics Corp., Taichung (TW)

(72) Inventors: Chien-Chin Huang, Taichung (TW); Shih-Min Tseng, Taichung (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 16/655,177

(22) Filed: Oct. 16, 2019

(65) Prior Publication Data

US 2020/0125692 A1   Apr. 23, 2020

(30) Foreign Application Priority Data

Oct. 18, 2018 (TW) .............................. 107136823 A

(51) Int. Cl.
*G06F 30/392* (2020.01)
*G06F 30/398* (2020.01)
*G06F 111/20* (2020.01)

(52) U.S. Cl.
CPC .......... *G06F 30/392* (2020.01); *G06F 30/398* (2020.01); *G06F 2111/20* (2020.01)

(58) Field of Classification Search
CPC ... G06F 30/392; G06F 30/398; G06F 2111/20
USPC ....................................................... 716/119
See application file for complete search history.

(56) References Cited

U.S. PATENT DOCUMENTS

| | | | |
|---|---|---|---|
| 10,078,717 B1* | 9/2018 | Venkataramani | ..... G06F 30/327 |
| 10,423,733 B1* | 9/2019 | Venkataramani | ..... G06F 30/331 |
| 2006/0240687 A1 | 10/2006 | Chong et al. | |
| 2009/0113373 A1 | 4/2009 | Fukuda | |
| 2019/0147124 A1* | 5/2019 | Nakayama | .......... G06F 9/30101 703/22 |
| 2019/0286763 A1* | 9/2019 | Kastner | .................... G06F 30/33 |
| 2019/0332732 A1* | 10/2019 | Kintali | ................ G06F 7/49915 |

FOREIGN PATENT DOCUMENTS

| | | |
|---|---|---|
| CN | 1925182 | 3/2007 |
| CN | 101487973 | 7/2009 |
| CN | 103853854 | 6/2014 |
| TW | 200910295 | 3/2009 |

* cited by examiner

*Primary Examiner* — Suresh Memula
(74) *Attorney, Agent, or Firm* — JCIPRNET

(57) ABSTRACT

An electronic apparatus and a layout method for an integrated circuit (IC) are provided. The layout method for the IC includes: receiving layout information, analyzing the layout information to obtain a plurality of blank areas in the IC; presetting a plurality of dummy blocks which respectively have a plurality of sizes; selecting at least one of the dummy blocks to fill in each of the blank areas based on a center position of each of the blank areas according to a size of each of the blank areas and generating updated layout information; performing a layout density checking operation on the updated layout information to generate a checking result; and shrinking sizes of a plurality of setting dummy blocks in the IC according to the checking result and generating output layout information.

20 Claims, 9 Drawing Sheets

ELECTRONIC APPARATUS AND LAYOUT METHOD FOR INTEGRATED CIRCUIT

CROSS-REFERENCE TO RELATED APPLICATION

This application claims the priority benefit of Taiwan application serial no. 107136823, filed on Oct. 18, 2018. The entirety of the above-mentioned patent application is hereby incorporated by reference herein and made a part of this specification.

BACKGROUND OF THE DISCLOSURE

1. Field of the Disclosure

The disclosure relates to an electronic apparatus and a layout method for an integrated circuit, and more particularly, relates to an electronic apparatus and a layout method that can easily adjust a layout density.

2. Description of Related Art

During a layout partition of the integrated circuit, layout engineers tend to make a circuit layout with relatively high density for achieving a maximize chip utilization rate. After completing the layout partition for a main circuit, layout engineers then conduct a filling operation of dummy blocks for blank areas in the integrated circuit. After the filling operation of the dummy blocks is completed for all the dummy blocks, the integrated circuit may not meet the requirements in design/layout specifications because the layout density is overly high. Under such condition, layout engineers can only manually perform an adjustment operation on each of the blank areas so the requirements in design/layout specifications can be met.

This kind of layout adjustment requires a lot of manpower. Also, since the adjustment operation manually performed by layout engineer may not succeed in one go, the adjustment operation may need to be repeatedly performed in order to meet the requirements in the design/layout specification. Consequently, time and manpower are wasted.

SUMMARY OF THE DISCLOSURE

The disclosure provides an electronic apparatus and a layout method for an integrated circuit, which can easily adjust a layout density.

The layout method for the integrated circuit (IC) of the disclosure includes: receiving layout information, analyzing the layout information to obtain a plurality of blank areas in the IC; presetting a plurality of dummy blocks which respectively have a plurality of sizes; selecting at least one of the dummy blocks to perform a filling operation on each of the blank areas based on a center position of each of the blank areas according to a size of each of the blank areas, and generating updated layout information; performing a layout density checking operation on the updated layout information to generate a checking result; and shrinking sizes of a plurality of setting dummy blocks in the IC according to the checking result and generating output layout information.

The electronic apparatus of the disclosure is configured to perform layout operations for the integrated circuit. The electronic apparatus includes a memory and a processor. The memory is configured to store layout information and layout information for presetting a plurality of dummy blocks. Here, the dummy blocks have different sizes. The processor is configured for: receiving layout information, analyzing the layout information to obtain a plurality of blank areas in the IC; selecting at least one of the dummy blocks to perform a filling operation on each of the blank areas based on a center position of each of the blank areas according to a size of each of the blank areas, and generating updated layout information; performing a layout density checking operation on the updated layout information to generate a checking result; and shrinking sizes of a plurality of setting dummy blocks in the IC according to the checking result and generating output layout information.

Based on the above, the disclosure may be used to automatically adjust the layout density of the integrated circuit by filling the blank areas of the integrated circuit with the dummy blocks having the different sizes and adjusting the size of the setting dummy block. In this way, the adjustment operation for the layout density of the integrated circuit may be completed by an automated approach to save the trouble of the manual adjustment and allow the layout density of the integrated circuit to be set more accurately.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
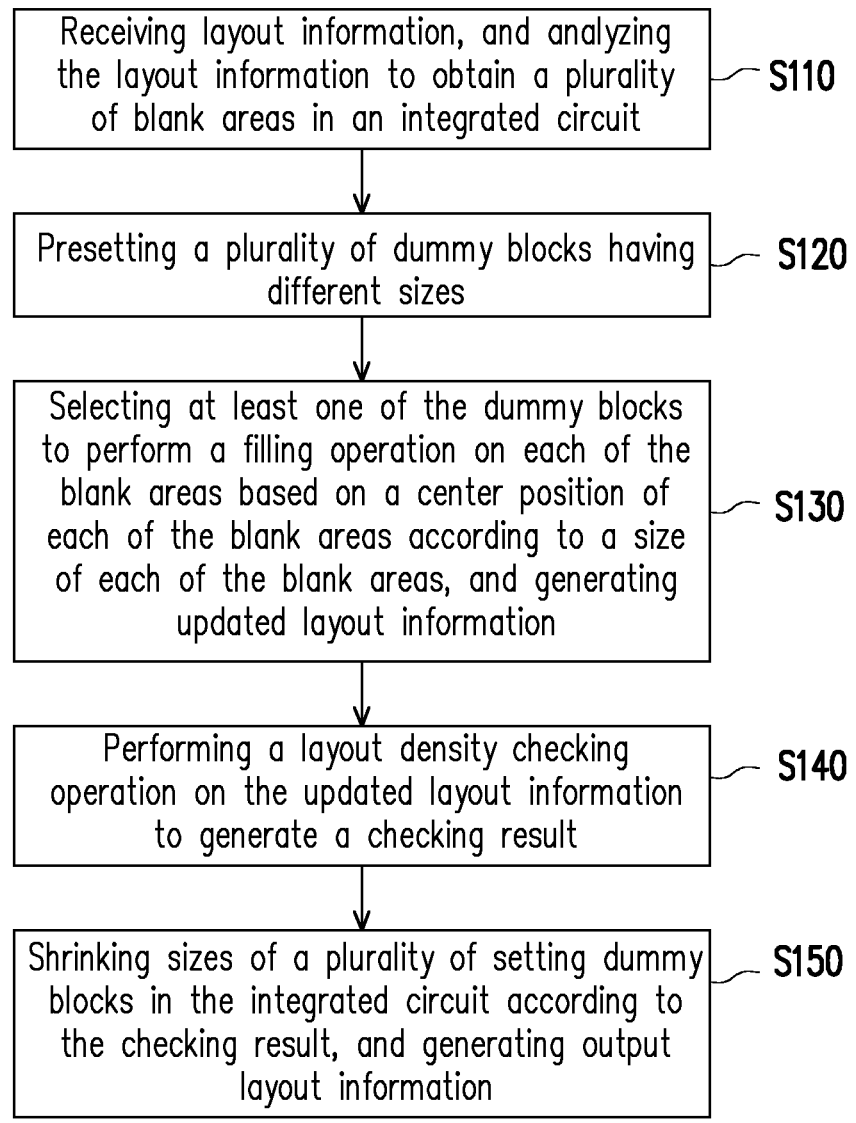
FIG. 1 is a flowchart illustrating a layout method for an integrated circuit in an embodiment of the disclosure.

Reference will now be made in detail to the preferred embodiments of the disclosure, examples of which are illustrated in the accompanying drawings. Wherever possible, the same reference numbers are used in the drawings and the description to refer to the same or like parts.

Figure 3A:
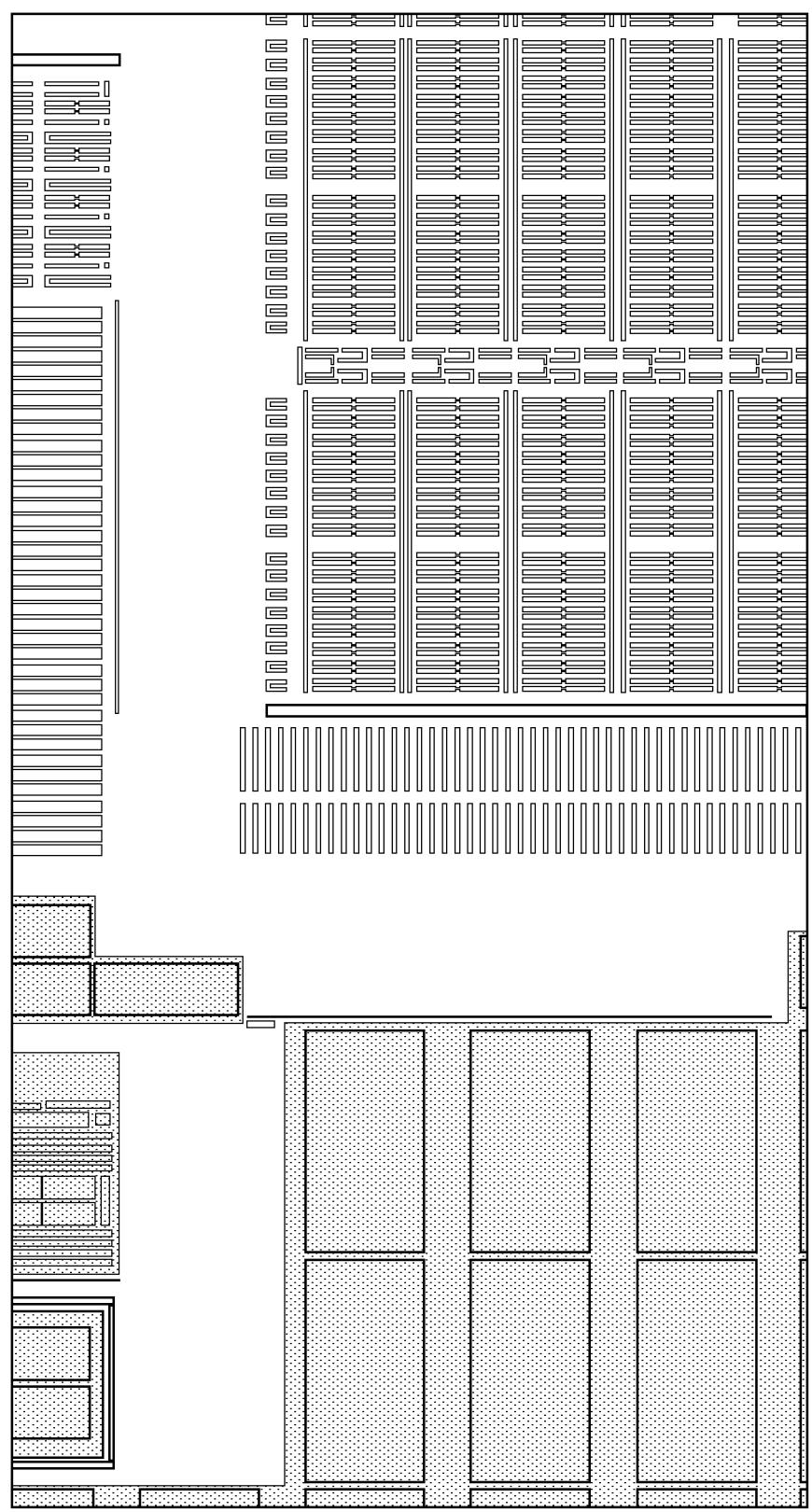
FIG. 3A and FIG. 3B are schematic diagrams illustrating a step in the layout method in an embodiment of the disclosure.

With reference to FIG. 1, in step S110, layout information is received, and the layout information is analyzed to obtain a plurality of blank areas in an integrated circuit. Here, the layout information may be related information in GDSII (Graphic Database System) format, and used to record plane geometric shapes, text labels, and information regarding a composition of structures in a layout of the integrated circuit. Regarding the details of the analysis for the blank areas, a first messy blank in the integrated circuit may first be obtained (as shown in FIG. 3A) according to the layout information, and a first rectangle with the maximum area in the first messy blank area may be found. Next, the first rectangle is removed from the first messy blank area and updated to obtain a second messy blank area, and then a second rectangle with the maximum area in the second messy blank area is found. The operation of analyzing for the blank areas may be completed by repeatedly executing the above steps until an area of an $(N+1)^{th}$ rectangle with the maximum area is less than a predetermined target. Here, the first rectangle to an $N^{th}$ rectangle are known as the blank areas.

Figure 3B:
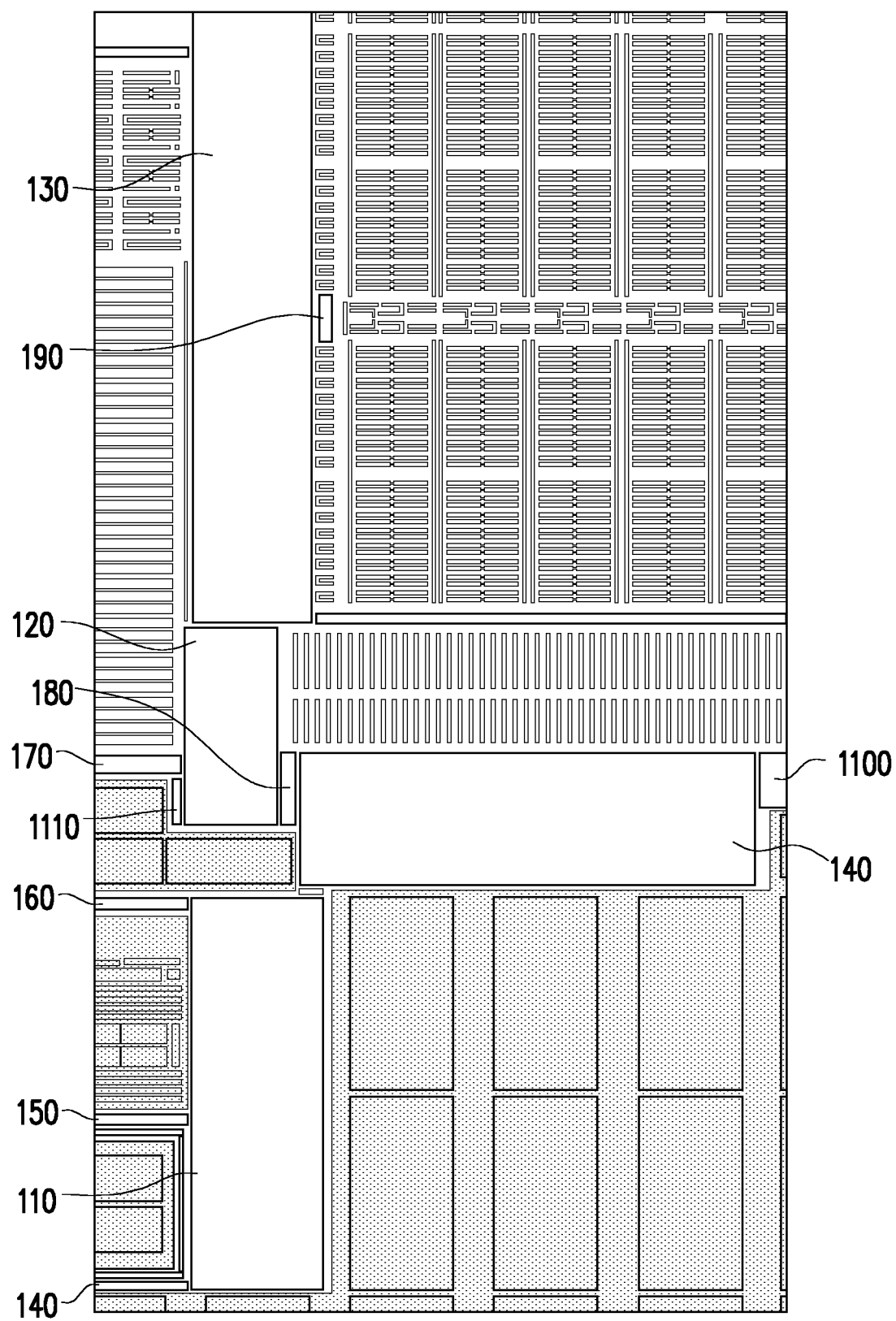

The following description refers to FIG. 1 and FIG. 3B together, and FIG. 3B shows a result of analyzing the layout information. In FIG. 3B, a plurality of blank areas 110 to 190, 1100, 1110 and 1120 in an integrated circuit 100 are identified. The identified blank areas 110 to 190, 1100, 1110 and 1120 may be framed in form of a rectangle. The blank areas 110 to 190, 1100, 1110 and 1120 may have identical or different sizes.

Figure 2A:
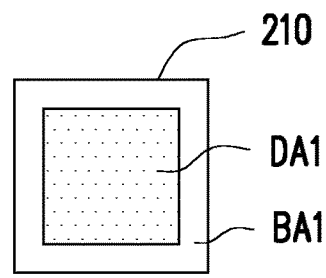
FIG. 2A to FIG. 2C are schematic diagrams illustrating a plurality of dummy blocks in an embodiment of the disclosure.

Next, in step S120, an operation of presetting a plurality of dummy blocks is performed. Here, the following description refers to FIG. 1 and FIG. 2A to FIG. 2C together. In FIG. 2A, the dummy block 210 may include a first density block DA1. The first density block DA1 may be formed by active area elements of the integrated circuit. In this embodiment, in addition to the first density block DA1, the dummy block 210 may also include a blank area BA1 with a fixed size.

Figure 2B:
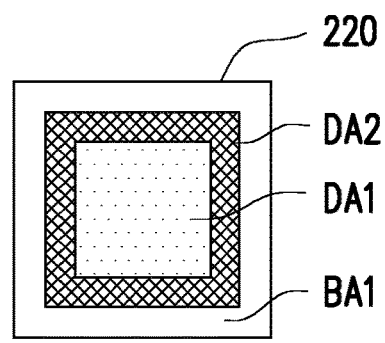

In FIG. 2B, a dummy block 220 includes the first density block DA1, a second density block DA2 and a blank area BA1. The second density block DA2 is disposed around the first density block DA1 and surrounds the first density block DA1. It should be noted that, a size of the dummy block 220 is larger than the dummy block 210. The second density block DA2 may be formed by, for example, a polysilicon layer in the integrated circuit.

Figure 2C:
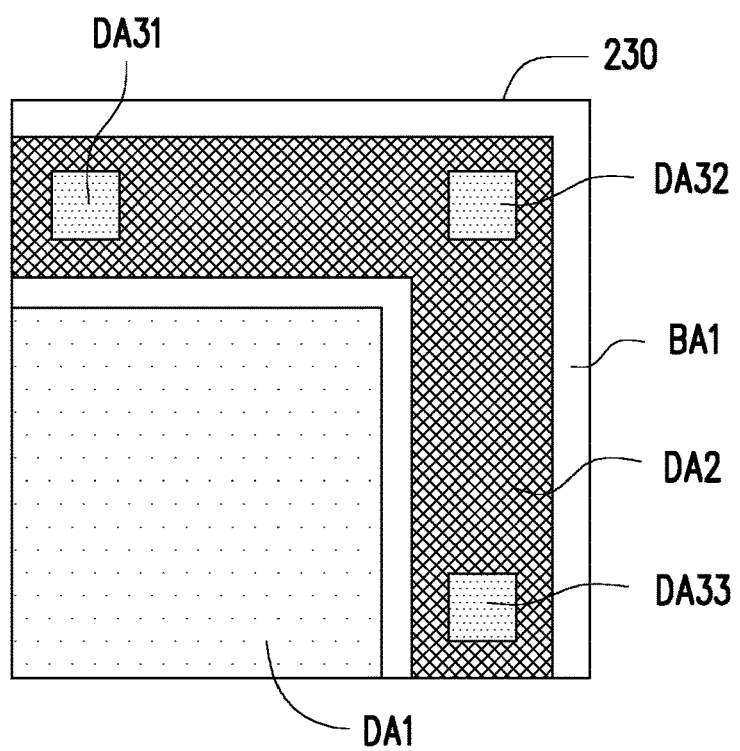

In FIG. 2C, a dummy block 230 includes the first density block DA1, the second density block DA2, a plurality of third density blocks DA31 to DA33 and the blank area BA1. The second density block DA2 is disposed on a periphery of the first density block DA1. The third density blocks DA31 to DA33 are inserted to the second density block DA2. The first density block DA1 and the third density blocks DA31 to DA33 may have an identical density, and may be formed by the active area elements of the integrated circuit. The second density block DA2 may be formed by, for example, a polysilicon layer in the integrated circuit. In certain embodiments of the disclosure, the dummy block 230 may not have the second density block DA2, or may not have the third density blocks DA31 to DA33. In addition, in the case where the dummy block 230 includes the third density blocks DA31 to DA33, the number of the third density blocks DA31 to DA33 may be one, two, three or more. The number (3) of the third density blocks DA31 to DA33 illustrated in FIG. 2C is merely an example, which is not intended to limit the scope of the disclosure. It should be noted that, a size of the dummy block 230 is larger than the size of the dummy block 220, and the size of the dummy block 220 is larger than the size of the dummy block 210.

In this embodiment, the dummy block 210, the dummy block 220 and the dummy block 230 have different layout densities.

Figure 4:
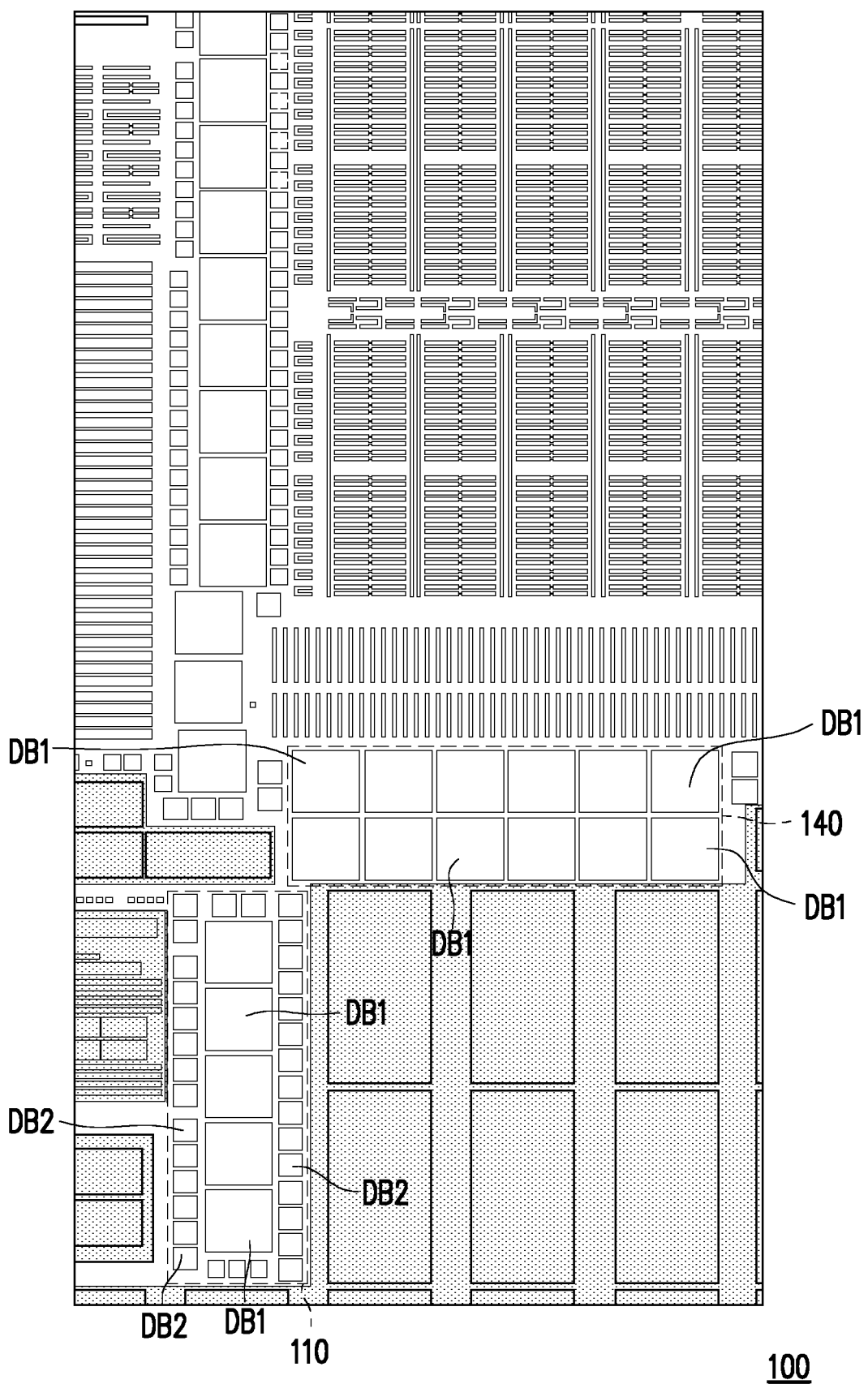
FIG. 4 is a schematic diagram illustrating another step in the layout method in an embodiment of the disclosure.

Next, referring back to FIG. 1, in step S130, at least one of the dummy blocks is selected to perform a filling operation on each of the blank areas based on a center position of each of the blank areas according to a size of each of the blank areas in the integrated circuit and updated layout information is generated. Referring to FIG. 1 and FIG. 4 together, in FIG. 4, with the blank area 140 as an example, the blank area 140 is filled with a plurality of dummy blocks DB1 of the same size. With the blank area 110 as an example, the blank area 110 is filled with a plurality of dummy blocks DB1 and a plurality of dummy blocks DB2. Here, sizes of the dummy block DB1 and the dummy block DB2 are different.

Here, it should be noted that, for the filling operation of the dummy block in the embodiment of the disclosure, a plurality of frames may be created respectively according to a plurality of preset dummy blocks. Here, the frames may be created according to sides of the corresponding dummy block. Further, when the blank area is to be filled with the dummy block, the blank area may simply be filled with the frame corresponding to the selected dummy block.

Regarding the details of the filling operation of the dummy blocks, an accommodatable quantity N may be calculated according to the size of each of the blank areas and a size of a first frame, and each of the blank areas may be with N said first frames, wherein N is an integer not less than 0. In detail, sizes of a long side and a short side of a rectangular blank area are measured so an accommodatable quantity (=X) of the first frames on the long side and an accommodatable quantity (=Y) of the first frames on the short side may be calculated. Then, a largest number (X*Y=N) of the first frames is determined accordingly so the largest number of frames can be filled in and placed at the center of the rectangular blank area. Next, one or more sub blank areas may be generated in each of the blank areas. In the embodiment of the disclosure, an accommodatable quantity M may be calculated according to a size of the sub blank area and a size of a second frame. Then, the sub blank area is sequentially filled with M said second frames having a smaller size.

By repeatedly executing the filling operation for each of the blank areas in the integrated circuit as described above, each of the blank areas in the integrated circuit may be filled with the dummy blocks and the updated layout information may be generated so as to complete step S130.

Referring back to FIG. 1, in step S140, a layout density checking operation is performed on the updated layout information. If a checking result indicates that a layout density of the integrated circuit is higher than a threshold, step S150 is executed to shrink sizes of a plurality of setting dummy blocks in the integrated circuit according to the checking result, and to generate output layout information.

Figure 5:
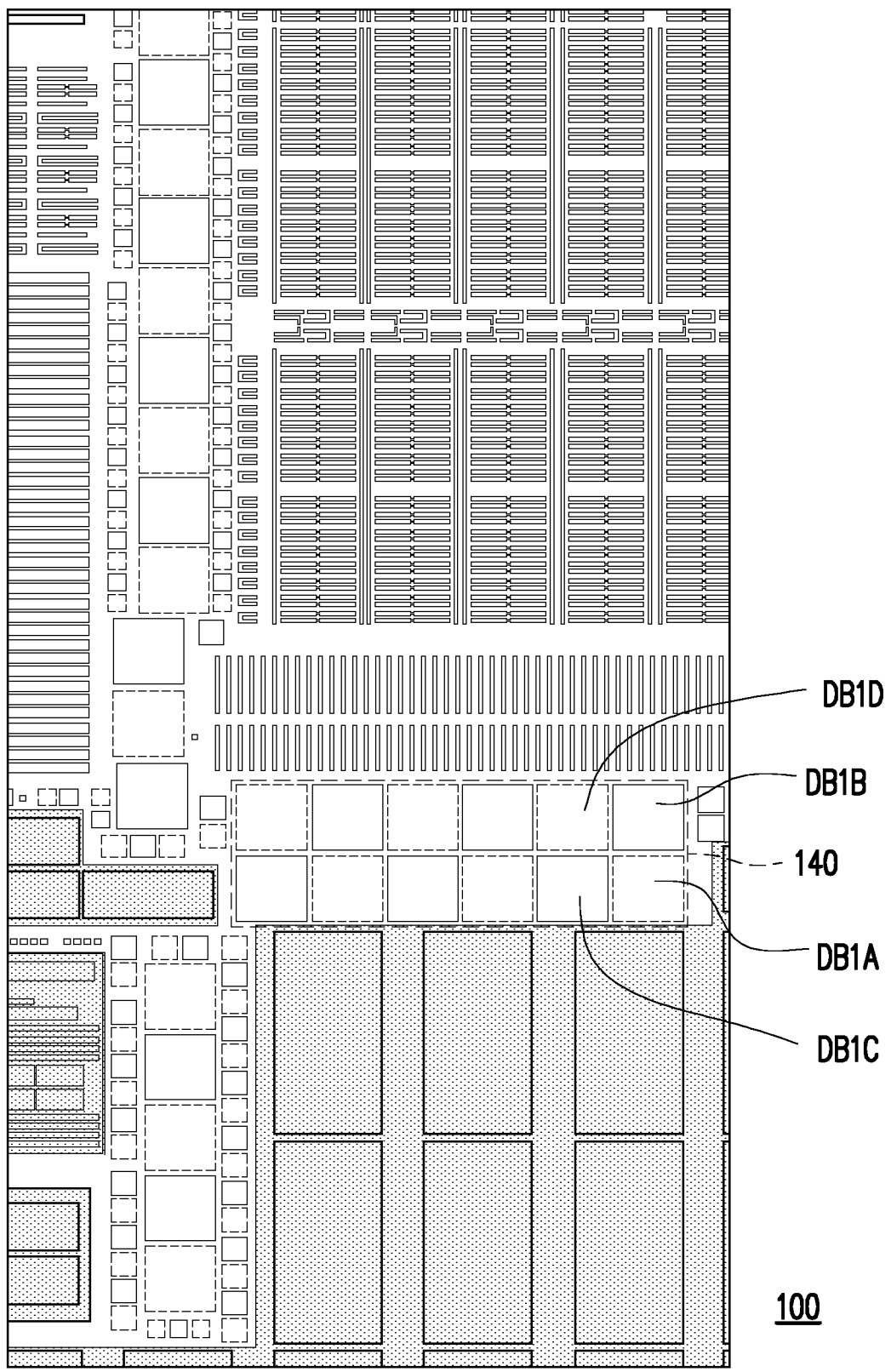
FIG. 5 and FIG. 6 are schematic diagrams illustrating another step in the layout method in an embodiment of the disclosure.
Figure 6:
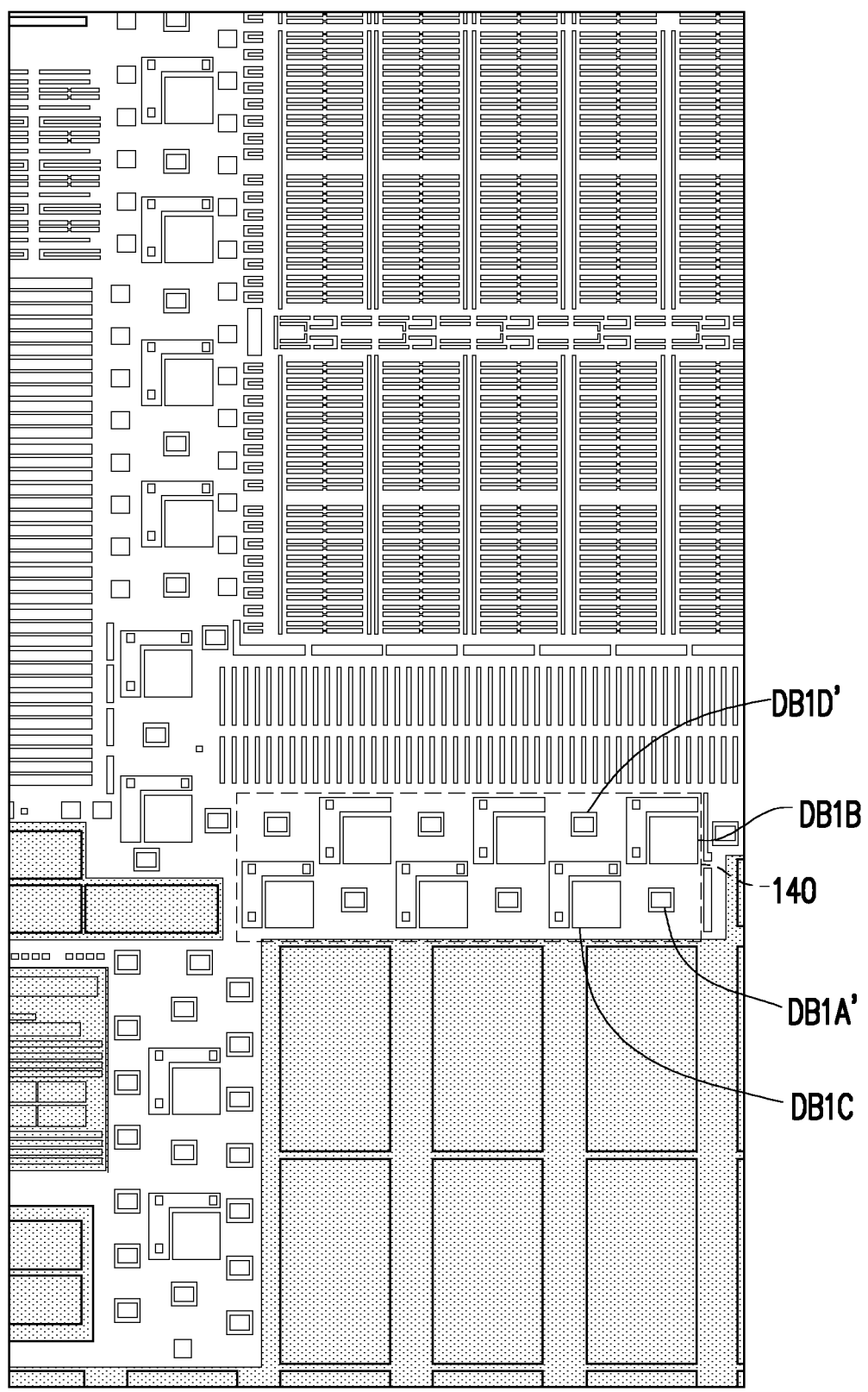

Implementation details regarding step S150 may refer to FIG. 1, FIG. 5 and FIG. 6 together. When the checking result indicates that the layout density of the checking result is higher than the threshold, at least one of the dummy blocks adjacent to each other among the dummy blocks in the integrated circuit may be set as the setting dummy block. In FIG. 5, one of two adjacent dummy blocks is set as the setting dummy block. For instance, with the blank area 140 in the integrated circuit 100 as an example, a dummy block DB1A and a dummy block DB1B are adjacent to each other in the horizontal direction. Accordingly, the dummy block DB1A may be set as the setting dummy block, and the dummy block DB1B may be set as a non-setting dummy block. Further, because the dummy block DB1A and a dummy block DB1C are adjacent in the vertical direction while the dummy block DB1A has been set as the setting dummy block, the dummy block DB1C may be set as the non-setting block. By analogy, a dummy block DB1D may be set as the setting dummy block.

The threshold described above may be obtained according to a design specification and/or a layout specification provided by production plant of the integrated circuit.

In FIG. 5, the dummy blocks represented by dashed boxes are the setting dummy blocks. On the other hand, the dummy blocks represented by solid boxes are the non-setting dummy blocks. In the actual setting details, a setting operation of the graphic data system (GDS) number may be performed for the setting dummy block and the non-setting dummy block separately. Here, the GDS number may be set to 1 for all the setting dummy blocks and the GDS number may be set to 0 for all the non-setting dummy blocks so a type of the dummy blocks can be identified accordingly.

Incidentally, the setting method for the setting dummy blocks may also be setting one or two of three adjacent dummy blocks as the setting dummy block or setting one, two or three of four adjacent dummy blocks as the setting dummy block without any particular limitation.

Incidentally, the operation related to the setting dummy block and the non-setting dummy block may be performed on the frames corresponding to the dummy blocks in other embodiments of the disclosure. Here, when the blank areas are filled only with related information of the frames, one of the adjacent frames may be set as a setting frame and another one of the adjacent frames may be a non-setting frame. Correspondingly, the setting operation of the GDS number may be performed on the setting frame and the non-setting frame.

Next, in FIG. 6, an operation of shrinking the sizes of the setting dummy block is performed. Here, with the blank area 140 in the integrated circuit 100 as an example, original positions of the dummy blocks DB1A and DB1D are replaced by replacing dummy blocks DB1A' and DB1D' having a relatively small size, whereas the non-setting dummy block DB1B and DB1C remains unchanged. In this embodiment, the replacing dummy blocks DB1A' and DB1D' may be the dummy block 220 of FIG. 2B, and the dummy blocks DB1B and DB1C may be the dummy block 230 of FIG. 2C.

By performing the operation of replacing blocks on the setting dummy blocks DB1A and DB1D, the blank area may have larger area at the original positions of the dummy blocks DB1A and DB1D, and thus the layout density of the integrated circuit 100 may be automatically reduced.

Incidentally, if the filling operation for the blank area is performed by using the frame corresponding to the dummy block, the operation of replacing the dummy blocks may simply be completed by replacing the corresponding frames.

After step S150 is completed, output layout information that meets the specification may be effectively generated.

Incidentally, after the step of generating the output layout information is completed, layout density distribution information of the integrated circuit may then be generated according to the output layout distribution information. The layout density distribution information may be represented in form of data, and provided to layout engineers and/or design engineers for analysis by ways of data analysis.

In addition, the output layout information is information that can meet the specification. Therefore, the output layout information may be provided for manufacturing photo masks and manufacturing physical integrated circuits by semiconductor manufacturing plant.

As can be seen from the above description, the layout method according to the embodiment of the disclosure may be used to adjust the layout density of the integrated circuit by the automated approach to meet the specification. In this way, the trouble of the manual adjustment may be saved, and the adjustment operation of the layout density may be completed quickly and accurately.

Figure 7:
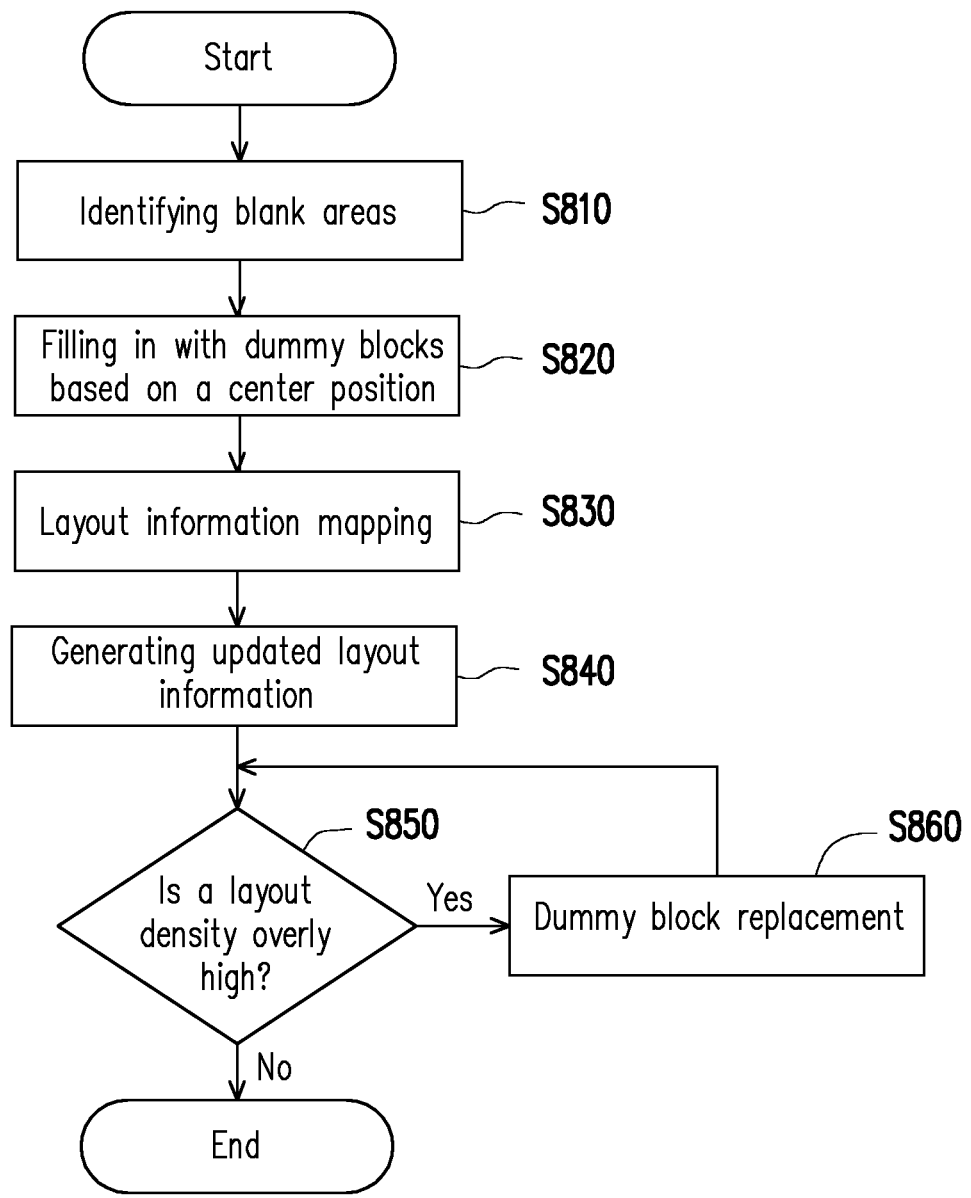
FIG. 7 illustrates a flowchart of the layout method in another embodiment of the disclosure.

With reference to FIG. 7, FIG. 7 is a flowchart illustrating the layout method in another embodiment of the disclosure. Here, in step S810, blank areas in an integrated circuit are identified. Next, in step S820, a filling operation of the dummy blocks is performed on each of the blank areas based on a center position of each of the blank areas. In step S820, the filling operation may be performed on the blank areas according to frames of dummy blocks. After the step S820 is completed, step S830 is executed to perform a mapping operation for the frames of the dummy blocks and the corresponding layout information, so as to fill in the blank area with an actual layout content of the dummy block. After the mapping operation is completed for all the frames of the dummy blocks and the layout information, updated layout information may be generated (step S840).

In step S850, a layout density checking operation is performed, and whether a layout density of the integrated circuit is overly high is checked. When the layout density of the integrated circuit is overly high, step S860 is executed to perform the operation of replacing the dummy blocks. By replacing the dummy blocks having a relatively large density by replacing dummy blocks having a relatively small density, the layout density of the integrated circuit may be effectively reduced. The layout operation of this embodiment is ended when the layout density of the integrated circuits meets the specification after the layout checking operation is repeatedly performed.

Relevant implementation detail for the steps above has been described in the foregoing embodiments, which are omitted hereinafter.

Figure 8:
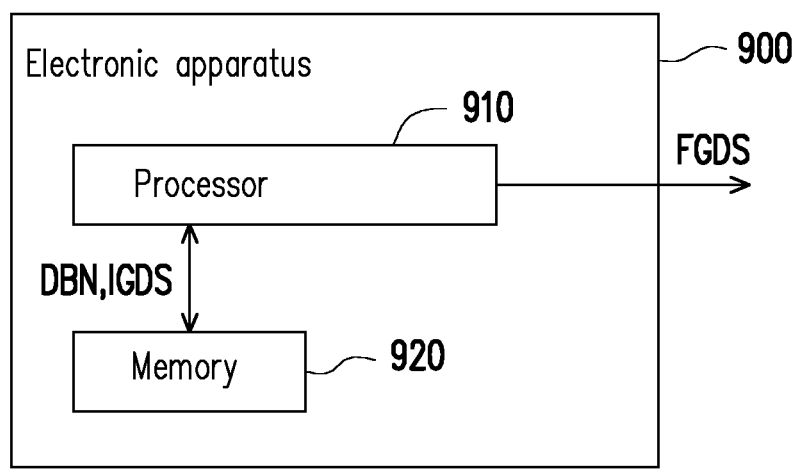
FIG. 8 is a schematic diagram illustrating an electronic apparatus according to an embodiment of the disclosure.

With reference to FIG. 8, FIG. 8 is a schematic diagram illustrating an electronic apparatus according to an embodiment of the disclosure. An electronic apparatus 900 includes a processor 910 and a memory 920. The processor 910 and the memory 920 are coupled to each other. The memory 920 is configured to store layout information IGDS and information for presetting a plurality of dummy blocks DBN. Here, the dummy blocks DBN have different sizes. The processor 910 receives the layout information IGDS and the information of the dummy blocks DBN from the memory 920, and executes the method described in the foregoing embodiments so as to adjust the layout density of the integrated circuit.

Relevant implementation details for the layout method above have been described in the foregoing embodiments, which are omitted hereinafter.

In summary, according to the disclosure, the layout density of the integrated circuit may be adjusted by presetting the dummy blocks, performing the filling operation on the blank areas based on the center position of the blank area by using the dummy block, and replacing the dummy blocks. As a result, the adjustment operation on the layout density of the integrated circuit does not need to be performed manually, but can be automatically performed to improve the efficiency of the layout work.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A layout method for an integrated circuit, comprising:
receiving layout information, and analyzing the layout information to obtain a plurality of blank areas in the integrated circuit;
presetting a plurality of dummy blocks, the plurality of dummy blocks having different sizes;
selecting at least one of the plurality of dummy blocks to perform a filling operation on each of the blank areas based on a center position of each of the blank areas according to a size of each of the blank areas, and generating updated layout information;
performing a layout density checking operation on the updated layout information to generate a checking result; and
shrinking sizes of a plurality of setting dummy blocks in the integrated circuit according to the checking result, and generating output layout information.

2. The layout method according to claim 1, wherein the step of selecting the at least one of the plurality of dummy blocks to perform the filling operation on each of the blank areas based on the center position of each of the blank areas according to the size of each of the blank areas comprises:
generating a plurality of frames respectively according to sides of the plurality of dummy blocks; and
selecting at least one of the plurality of dummy blocks, and performing the filling operation on each of the blank areas based on the center position of each of the blank areas by using the frame corresponding to the selected dummy block.

3. The layout method according to claim 2, wherein the step of selecting the at least one of the plurality of dummy blocks to perform the filling operation on each of the blank areas based on the center position of each of the blank areas according to the size of each of the blank areas further comprises:
calculating an accommodatable quantity N according to the size of each of the blank areas and a size of a first frame, and filling each of the blank areas with N said first frames, wherein N is an integer not less than 0.

4. The layout method according to claim 3, wherein at least one sub blank area is generated after each of the blank areas is filled with N said first frames, and the step of selecting the at least one of the plurality of dummy blocks to perform the filling operation on each of the blank areas based on the center position of each of the blank areas according to the size of each of the blank areas further comprises:
calculating an accommodatable quantity M according to a size of the sub blank area and a size of a second frame, and filling the sub blank area with M said second frames, wherein M is an integer not less than 0, wherein the size of the first frame is larger than the size of the second frame.

5. The layout method according to claim 4, wherein the step of shrinking the sizes of the plurality of setting dummy blocks in the integrated circuit according to the checking result comprises:
replacing a plurality of setting frames corresponding to the plurality of setting dummy blocks by a plurality of the second frames,
wherein a size of each of the setting frames is larger than a size of each of the second frames.

6. The layout method according to claim 1, wherein the step of shrinking the sizes of the plurality of setting dummy blocks in the integrated circuit according to the checking result comprises:
setting at least one of the plurality of dummy blocks adjacent to each other among the plurality of dummy blocks in the integrated circuit as the setting dummy block; and
replacing each of the plurality of setting dummy blocks by a replacing dummy block when the checking result indicates that a layout density of the integrated circuit is higher than a threshold,
wherein a density of the replacing dummy block is less than a density of each of the setting dummy block.

7. The layout method according to claim 1, wherein the output layer information is provided to serve as information for manufacturing the integrated circuit.

8. The layout method according to claim 1, further comprising:
generating layout density distribution information according to the output layout information.

9. The layout method according to claim 1, wherein each of the plurality of dummy blocks comprises a first density block.

10. The layout method according to claim 9, wherein each of the plurality of dummy blocks further comprises a second density block, wherein the second density block is disposed on a periphery of the first density block.

11. The layout method according to claim 10, wherein each of the plurality of dummy blocks further comprises at least one third density block, the at least one third density block is disposed inside the second density block, and the at least one third density block and the first density block have an identical density.

12. An electronic apparatus, configured to perform a layout operation for an integrated circuit, comprising:
a memory, configured to store layout information and information for presetting a plurality of dummy blocks, wherein the plurality of dummy blocks have different sizes; and
a processor, configured for:
receiving the layout information, analyzing the layout information and obtaining a plurality of blank areas in the integrated circuit;
selecting at least one of the plurality of dummy blocks to perform a filling operation on each of the blank areas based on a center position of each of the blank areas according to a size of each of the blank areas, and generating updated layout information;
performing a layout density checking operation on the updated layout information to generate a checking result; and
shrinking sizes of a plurality of setting dummy blocks in the integrated circuit according to the checking result, and generating output layout information.

13. The electronic apparatus according to claim 12, wherein each of the plurality of dummy blocks comprises a first density block.

14. The electronic apparatus according to claim 13, wherein each of the plurality of dummy blocks further comprises a second density block, wherein the second density block is disposed on a periphery of the first density block.

15. The electronic apparatus according to claim 14, wherein each of the plurality of dummy blocks further comprises at least one third density block, the at least one third density block is disposed inside the second density block, and the at least one third density block and the first density block have an identical density.

16. The electronic apparatus according to claim 12, wherein in an operation of selecting the at least one of the plurality of dummy blocks to perform the filling operation on each of the blank areas based on the center position of each of the blank areas according to the size of each of the blank areas, the processor is configured for:

generating a plurality of frames respectively according to sides of the plurality of dummy blocks; and selecting at least one of the plurality of dummy blocks, and performing the filling operation on each of the blank areas based on the center position of each of the blank areas by using the frame corresponding to the selected dummy block.

17. The electronic apparatus according to claim 16, wherein in the operation of selecting the at least one of the plurality of dummy blocks to perform the filling operation on each of the blank areas based on the center position of each of the blank areas according to the size of each of the blank areas, the processor is further configured for:

calculating an accommodatable quantity N according to the size of each of the blank areas and a size of a first frame, and filling each of the blank areas with N said first frames, wherein N is an integer not less than 0.

18. The electronic apparatus according to claim 17, wherein at least one sub blank area is generated after each of the blank areas is filled with N said first frames, and in the operation of selecting the at least one of the plurality of dummy blocks to perform the filling operation on each of the blank areas based on the center position of each of the blank areas according to the size of each of the blank areas, the processor is further configured for:

calculating an accommodatable quantity M according to a size of the sub blank area and a size of a second frame, and filling the sub blank area with M said second frames, wherein M is an integer not less than 0, wherein the size of the first frame is larger than the size of the second frame.

19. The electronic apparatus according to claim 18, wherein in the operation of shrinking the sizes of the plurality of setting dummy blocks in the integrated circuit according to the checking result, the processor is further configured for:

replacing a plurality of setting frames corresponding to the plurality of setting dummy blocks by a plurality of the second frames, wherein a size of each of the setting frames is larger than a size of each of the second frames.

20. The electronic apparatus according to claim 12, wherein in the operation of shrinking the sizes of the plurality of setting dummy blocks in the integrated circuit according to the checking result, the processor is further configured for:

setting at least one of the plurality of dummy blocks adjacent to each other among the plurality of dummy blocks in the integrated circuit as the setting dummy block; and replacing each of the plurality of setting dummy blocks by a replacing dummy block when the checking result indicates that a layout density of the integrated circuit is higher than a threshold, wherein a density of the replacing dummy block is less than a density of each of the setting dummy block.

* * * * *